United States Patent [19]

Maehara et al.

[11] 4,352,295

[45] Oct. 5, 1982

[54] INSTANTANEOUS TORQUE DETERMINING APPARATUS

[75] Inventors: Osamu Maehara; Tooru Sasaki, both of Kawasaki, Japan

[73] Assignee: Ono Sokki Co., Ltd., Yaguchi, Japan

[21] Appl. No.: 48,493

[22] Filed: Jun. 14, 1979

Related U.S. Application Data

[63] Continuation-in-part of Ser. No. 893,037, Apr. 3, 1978, abandoned, which is a continuation-in-part of Ser. No. 755,213, Dec. 29, 1976, abandoned.

[30] Foreign Application Priority Data

May 22, 1976 [JP] Japan .............................. 51-59777
May 22, 1976 [JP] Japan .............................. 51-59778

[51] Int. Cl.$^3$ .............................................. G01L 3/10
[52] U.S. Cl. .............................................. 73/862.34
[58] Field of Search ........................... 73/136 A, 862.34

[56] References Cited

U.S. PATENT DOCUMENTS

3,640,131 2/1972 Turk .................................. 73/136 A
4,020,685 5/1977 Van Millingen et al. ......... 73/136 A
4,122,709 10/1978 Brown et al. ...................... 73/136 A

OTHER PUBLICATIONS

Ohigashi, et al.–"A New Electronic Device for Measuring Torque" SAE Transactions, vol. 74, 1966.

Primary Examiner—Charles A. Ruehl
Attorney, Agent, or Firm—McAulay, Fields, Fisher, Goldstein & Nissen

[57] ABSTRACT

An instantaneous torque determining apparatus for obtaining the instantaneous torque value continuously of a shaft rotating at a high speed. The apparatus includes a pair of spaced gears mounted on the shaft, a torque detector having a pickup for each gear, a set of voltage comparators, a gate control circuit, an AND circuit, and a clock pulse generator. Further, the apparatus also includes a delay circuit for receiving pulses from a voltage comparator, a subtraction counter which receives a delayed pulse as a subtractor starting instruction, and a set of first and second ratio multipliers forming a counting circuit loop with the counter. First and second latch circuits store the counted value outputs and apply such outputs as an input to another counter and to a Digital-Analogue transducer. The pick-ups of the torque detectors are respectively arranged to face the gear to provide voltage signals in pulse form when the shaft rotates and each tooth of the gear passes in front of its respective pick-up. The phase difference in each period of the voltage signals is proportional to the instantaneous value of torque applied to the shaft and an inverse value of the period of these voltage signals is proportional to the instantaneous rotating speed of the shaft.

5 Claims, 5 Drawing Figures

INSTANTANEOUS TORQUE DETERMINING APPARATUS

CROSS-REFERENCE TO RELATED APPLICATIONS

This application is a continuation-in-part of our earlier filed U.S. patent application, Ser. No. 893,037 filed Apr. 3, 1978, now abandoned which in turn is a continuation-in-part of our U.S. patent application Ser. No. 755,213, filed Dec. 29, 1976, now abandoned.

BACKGROUND OF THE INVENTION

1. Field of the Invention

This invention relates to an apparatus for measuring the torque value and rotating speed of revolving machines such as engines and motors. More particularly, it concerns an apparatus for continuously measuring instantaneous values of the torque and rotating speed through real time calculation of them for each period of a pair of AC voltage signals received from an ordinary torque detector comprising a pair of gears secured to the shaft of a revolving machine at a distance from each other and electromagnetic pick-ups each disposed to face each of the gears.

2. Description of the Prior Art

The construction and operation of the conventional torque detecting apparatus will be described with reference to the accompanying drawing, in which FIG. 1 shows a schematic view of an ordinary torque detector mounted on a rotative shaft. FIG. 2 is a block diagram of a prior-art apparatus for measuring the instantaneous values of torque and rpm, and FIG. 3 is a waveform chart composed of a series of graphs of electrical wave shapes showing outputs of circuits shown in FIG. 2 for illustrating and assisting in the explanation of the operation of the apparatus of FIG. 2.

The apparatus of the prior art comprises a pair of gears 2, 3 mounted on a rotating shaft 1 at a suitable distance from each other and a pair of electromagnetic pick-ups or detectors 4 and 5 each disposed to face the tooth top of each of the gears 2 and 3.

With rotation of the shaft 1 the gears 2 and 3 are also rotated in unison, and AC voltage signals periodically varying according to the tooth form of the gears 2 and 3 are produced from the electro-magnetic pick-ups 4 and 5.

The frequency of the AC voltage signals is determined by the rotating speed on the shaft 1 and the number of teeth of the gears 2 and 3. In general, the gears 2 and 3 have the same number of teeth, so that the AC voltage signals produced from the electromagnetic pick-ups 4 and 5 have the same frequency.

Meanwhile, when torque is applied to the shaft 1, the shaft 1 is twisted in proportion to the torque, and as a result the gears 2 and 3 are displaced in the peripheral directions in proportion to the angle of twist in the shaft portion with the gears 2 and 3 mounted thereon.

Thus, the timing of generation of AC voltage signals produced from the electromagnetic pick-ups 4 and 5 is changed in proportion to the displacement of the gears 2 and 3 in the peripheral direction. Consequently, a phase difference proportional to the angle of twist of the shaft portion 1 between the gears 2 and 3 is provided between the two AC voltage signals.

As is shown, the pair of AC voltage signals produced from the usual torque detector has a phase difference proportional to the torque and a frequency proportional to the rotating speed of the shaft, and they are transmitted to a measuring apparatus for measuring the instantaneous values of torque and rotating speed.

The terms "instantaneous value of torque" and "instantaneous value of rotating speed" are accurately defined here respectively as average torque and average rotating speed within a time interval required for the rotation of the shaft 1 for one pitch of the teeth of the gears 2 and 3, that is, within the period of the AC voltage signals, measured for each period. However, assuming the number of teeth to be, for instance, 60, the averaging period is very short, namely 0.0002 sec. at 5,000 rpm and 0.0001 sec. at 10,000 rpm, so that the average value can be regarded to be the instantaneous value.

FIG. 2 shows a measuring apparatus for measuring the instantaneous values of torque and rotating speed from a pair of AC voltage signals taken out from the usual torque detector shown in FIG. 1.

In FIG. 2, designated at 4 and 5 are the aforementioned pick-ups, and the AC voltage signals therefrom are transmitted to respective voltage comparators 10 and 11 for comparison with zero potential. These voltage comparators each provide a pulse every time the AC voltage signal comes to coincidence with zero potential as it changes from the negative potential to the positive potential. The pulse outputs of the voltage detectors 10 and 11 are pulse series signals as shown at 10 and 11 in FIG. 3 comprising pulses each produced for each period of the period of the AC voltage signals. Designated at 12 is a gate control circuit, to which the pulses of the voltage comparators 10 and 11 are transmitted as gate control signal, and which produces a gate signal which becomes "on" when the pulse series signal from the voltage comparator 10 leading in the timing of generation is transmitted and "off" when the pulse series signal from the other voltage comparator 11 is transmitted. Thus, the time interval of the "on" state of the gate signal is equal to the difference of the timing of generation between the two voltage signals.

Designated at 13 is an AND circuit, and at 14 a clock pulse generator. The AND circuit 13 receives the gate signal from the gate control circuit 12 and clock pulses from the clock pulse generator 14 and passes clock pulses only for the time interval of the "on" state of the gate signal. Thus, the output of the AND circuit 13 is a pulse signal group, in which clock pulses are present only for a time interval corresponding to the difference of the timing of generation between the two AC voltage signals.

Designated at 15 is a data recorder for recording the pulse group signal produced from the AND circuit 13.

By the above prior-art apparatus, the instantaneous values of torque and rotating speed are calculated from the recorded pulse signal. However, it has to be noted that the number of pulses in each pulse group which numbers are counted while the pulse group signal is recorded in the data recorder 15, is not proportional to the instantaneous torque.

This is because along with doubling of the rotating speed of the shaft 1, the frequency of the AC voltage signals is also doubled, and consequently the difference T" (T"₁, T"₂, ...) of the timing of generation between the two AC voltage signals is reduced to one half. Thus, the number of pulses in each pulse group is reduced to one half even if the phase difference (owing to torque) is the same. Accordingly, it has hitherto been in practice to once record the pulse group signal in a data recorder 15 and then reproduce it and transmit it to a computer for counting the number of pulses in each pulse group proportional to the difference T" of the timing of generation between the two AC voltage signals while also measuring the period for each pulse group which is equal to the period T of the AC voltage signals to determine the instantaneous torque value through calculation of the ratio T"/T proportional to the phase difference between the AC voltage signals and also determine the instantaneous rotating speed value through calculation of the inverse value 1/T of the period T of the pulse group.

In this case, with the computer it is difficult to make the above calculation for each period T since the calculation required time. Therefore, it has been in practice to progressively measure and memorize the number of pulses in each pulse group and the period between adjacent pulse groups of pulse group signals introduced from the data recorder 15 and make the above calculation.

As has been shown, in the prior art in order to obtain the instantaneous values of torque and rotating speed it has been necessary to once record data and then reproduce them for calculation. Therefore, a great deal of time delay is involved until the instantaneous values of torque and rotating speed are obtained, so that the results of measurement cannot be obtained on a real time basis.

In order to resolve this shortcoming there have been attempts to attach a strain gauge to the shaft 1 and convert the strain of the shaft in proportion to the torque to the corresponding voltage signal. However, the apparatus used to this end requires a slip ring for taking out the signal, so that it provides problems in its durability. In addition, since the signals are treated analogwise, the precision in the strain gauge system is inferior to the first mentioned apparatus.

SUMMARY OF THE INVENTION

The primary object of the invention is to provide an apparatus for measuring the instantaneous values of torque and rotating speed, which precludes the drawbacks inherent in the prior art.

Another object of the invention is to provide an apparatus, with which the instantaneous values of torque and rotating speed can be obtained continuously and on a real time basis.

A further object of the invention is to provide and apparatus of the above type, in which measurement and calculation are made by a new digital method making use of clock pulses for calculating the phase difference between a pair of AC voltage signals taken out from the torque detector, proportional to torque, and the inverse value of the period proportional to the rotating speed, for each period with high precision and at high speed.

The apparatus according to the invention receives a pair of AC voltage signals produced by an ordinary torque detector.

The pair of AC voltage signals are converted through respective comparators into respective pulse series signals each containing pulses which are produced for each period of them.

The period T of these pulse series signals is inversely proportional to the instantaneous rotating speed, and the ratio of the difference T" of the timing of generation between these pulse series signals to the period T is proportional to the instantaneous torque.

The apparatus according to the invention comprises the following circuit groups:

[i] A circuit for producing a pulse group signal consisting of clock pulse signals each present only during the time interval corresponding to the difference T" of the timing of generation between the afore-mentioned pair pulse signals;

[ii] A loop circuit for producing a value inversely proportional to the elapsed time;

[iii] A circuit for controlling the operation period of the loop circuit by the period T of the pulse series signals and latching the inverse value 1/T of the period T of the pulse series signals for each period T; and

[iv] A circuit for calculating T"/T by multiplying a pulse group signal formed by the afore-mentioned first circuit (i) by a factor proportional to the inverse value 1/T to the period latched by the afore-mentioned third circuit (iii) and latching the resultant product for each period T.

The first circuit (i) includes a gate control circuit to receive a pair of pulse series signals and produce a gate signal, which becomes "on" upon appearance of a pulse in one of the pulse series signals and becomes "off" upon appearance of a pulse in the other pulse series signal and an AND circuit to pass clock pulses only for the period of the "ON" state of the gate signal so as to form a pulse group signal. The number of pulses in each pulse group in of the pulse group signal is f.T" where f is the clock pulse frequency.

The second loop circuit (ii) is the most important part of the invention and includes a first ratio multiplier to receive clock pulses of the clock pulse generator, a second ratio multiplier to receive output pulses of the first ratio multiplier and a subtraction counter to receive output pulses of the second ratio multiplier and subtract these pulses from an initial value M every time a pulse is received so as to provide the result of subtraction as ratio presetting input to the first and second ratio multipliers. In the subtraction counter, the initial value is set upon impression of an external subtraction start command, and the subtraction count N is reduced to M-1, M-2, M-3,—every time an output pulse of the second ratio multiplier is received. The preset value for the first and second ratio multipliers is M, and the ratio value becomes N/M with the impression of the subtraction count N. Since N changes instantaneously, N/M also changes instantaneously.

The change ΔN of the subtraction count for a very short period Δt elapsed from an instant t is given as $$\Delta N = - \left( \frac{N}{M} \right)^2 \cdot f \cdot \Delta t \tag{1}$$

where N is the subtraction count. In this equation Δt represents a very short period of time, so by substituting dt for Δt and dN for ΔN we obtain $$-\frac{1}{N^2} dN = \frac{f}{M^2} dt \tag{2}$$

By solving this equation it will be seen that the subtraction count N at instant t changes in inverse proportion to time as expressed by an equation $$N = \frac{M^2}{f} \cdot \frac{1}{(t + M/f)} \qquad (3)$$

In other words, in this loop circuit the subtraction count of the subtraction counter is M at the time of the start of counting and is thereafter inversely proportional to (t+M/f).

The third circuit (iii) includes a delay circuit to receive the pulse series signal which is leading in the pulse generation timing and delay each received pulse for a constant time M/f so as to transmit the delayed pulse as subtraction start command to the subtraction counter in the second circuit (ii) and a latch circuit to receive the subtraction count of the subtraction counter and also receive the afore-mentioned leading pulse series signal as latch command.

Thus, the subtraction count latched in the latch circuit has a value that results when the loop circuit is operated for a period t shorter than the period T of the pulse series signal by M/f, that is, $$t = T - M/f \qquad (4)$$

Subtraction of equation (4) into equation (3) gives the subtraction count N at that time as $$N = \frac{M^2}{f} \cdot \frac{1}{T}. \qquad (5)$$

This means that the value N latched in the latch circuit for each period T of the pulse series signal is proportional to the inverse value of the period T.

Thus, by measuring N of this latch circuit the instantaneous rotating speed can be obtained on a real time basis. If a digital-to-analog converter is connected to the latch circuit, an analog signal proportional to the inverse value of the period T of the AC voltage signals can be obtained, so that it is possible to obtain a high response type of the generally termed F-V converter.

The fourth circuit (iv) includes a ratio multiplier to receive the pulse group signal from the first circuit (i) and also receive the latched value in the latch circuit in the third circuit (iii) as ratio value setting signal, a counter for counting the output pulses of the ratio multiplier and a second latch circuit to receive the count of the counter and latch the count while at the same time resetting the counter every time it receives the aforementioned leading pulse series signal.

The ratio value presetting quantity in the ratio multiplier is M, and with application of the latch value N of the latch circuit in the third circuit (iii) the ratio value becomes N/M. The count of the counter latched in the second latch circuit is N/M times the number of pulses in the pulse group signal introduced during the period T thereof, that is, it is N/M times the pulse number T″·f in each pulse group in the first circuit (i). By substituting equation (5) the value latched in the second latch circuit for each period T of the pulse series signal is $$T'' \cdot f \cdot \frac{N}{M} = T'' \cdot f \cdot \frac{1}{M} \cdot \frac{M^2}{f} \cdot \frac{1}{T} = M \cdot \frac{T''}{T} \qquad (6)$$

This means that the value latched by the second latch circuit is proportional to the ratio of the difference T″ of the timing of generation between the pair pulse series signals to the period T thereof.

Thus, by measuring the value latched by the second latch circuit for each period of the pulse series signals the phase difference between the two AC voltage signals corresponding to T″/T, i.e., the instantaneous torque value, can be obtained on the real time basis. Also, by converting the output of the latch circuit from digital to analog an analog signal proportional to the instantaneous torque can be obtained.

DESCRIPTION OF THE PREFERRED EMBODIMENT

The invention will now be described in detail in conjunction with an embodiment shown in FIGS. 4 and 5.

To facilitate the understanding of the invention, the circuit in the embodiment shown in FIG. 4 will now be described by dividing it into four component circuits depending upon respective functions.

(i) A circuit for producing a pulse group signal consisting of clock pulses existing in the time interval corresponding to the difference T″ of the timing of generation between a pair of AC voltage signals caused from a conventional torque detector;

(ii) A loop circuit for producing a value changing in inverse proportion to the elapsed time;

(iii) A circuit for controlling the operation period of the loop circuit by the period T of the pulse series signals and latching the inverse value 1/T of the period T of the pulse series signals for each period T; and (iv) A circuit for calculating T″/T by multiplying a pulse signal formed by the afore-mentioned first circuit (i) by a factor proportional to the inverse value 1/T to the period latched by the aforementioned third circuit (iii) and latching the resultant product for each period T.

These circuits (i) to (iv) are simultaneously operated such that the inverse value 1/T to the period of a pair of AC voltage signals which are transmitted from a usual torque detector, proportional to the instantaneous rotating speed, is taken out from the third circuit (iii) for each period of the AC voltage signals and that the ratio of the difference T″ of the timing of generation between the pair of AC voltage signals to the period T thereof, that is, the phase difference between the pair AC voltage signals, proportional to the instantaneous torque is taken out from the fourth circuit (iv).

The construction of the above component circuits will now be described in detail one after another with reference to FIG. 4.

Figure 2:
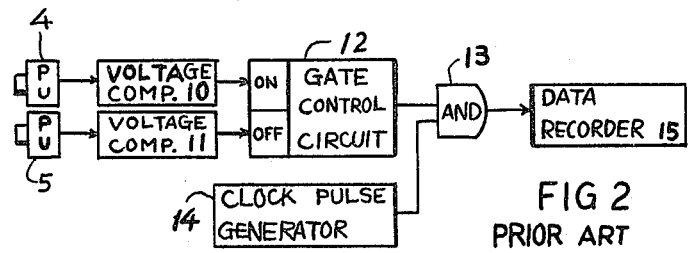
FIG. 2 is a block diagram showing a prior-art system and apparatus proposed for the measurement of the instantaneous values of torque and rotating speed.
Figure 3:
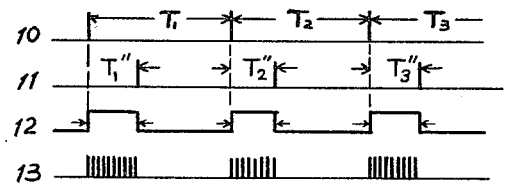
FIG. 3 is a waveform chart showing the outputs in various parts of the circuit shown in FIG. 2 to illustrate the operation of the prior-art apparatus shown in FIG. 2.

The first-mentioned circuit (i) includes voltage comparators 10 and 11 to receive a pair of AC voltage signals produced from respective electro-magnetic pickups 4 and 5 of a usual torque detector, a gate control circuit 12 to receive the outputs of the voltage comparators 10 and 11 as gating control signal and an AND circuit 13 to pass clock pulses from a clock pulse generator 14 during the period of the "on" state of a gate signal produced the gate control circuit 12. The circuits 10 to 14 are respectively the same as those designated by like reference numerals in FIG. 2.

The second circuit (ii) includes a first ratio multiplier 23 to receive clock pulses from the afore-mentioned clock pulse generator 14, a second ratio multiplier 24 to receive the output pulses of the first ratio multiplier 23 and a subtraction counter 22 to receive output pulses from the second ratio multiplier 24 and subtract these pulses from a preset initial value every time a pulse is received so as to provide the result of such subtraction as a presetting input to the first and second ratio multipliers 23 and 24.

The third circuit 21 (iii) includes a delay circuit to receive the output pulses of the voltage comparator 10 and delay each received pulse for a constant time so as to transmit the delayed pulse as subtraction start command to the subtraction counter 22 and a first latch circuit 25 to receive the subtraction count produced from the subtraction counter 22 and also receive the output pulses of the voltage comparator 10 as latch command.

The fourth circuit (iv) includes a third ratio multiplier 26 to receive the output pulse group signal from the AND circuit 13 and also receive the value latched by the first latch circuit 25 as ratio value setting signal, a counter 27 to receive the output of the third ratio multiplier 26, i.e., the product of the number of pulses in each group and the ratio, a second latch circuit 28 to receive each output pulse from the voltage comparator 10 as latch command for latching the count at the corresponding instant and then resetting the counter 27 and a digital-to-analog converter 29 for converting the count latched by the second latch circuit 28 into a corresponding analog signal.

The operation of the above circuits will now be described with reference to FIGS. 5.

Figure 4:
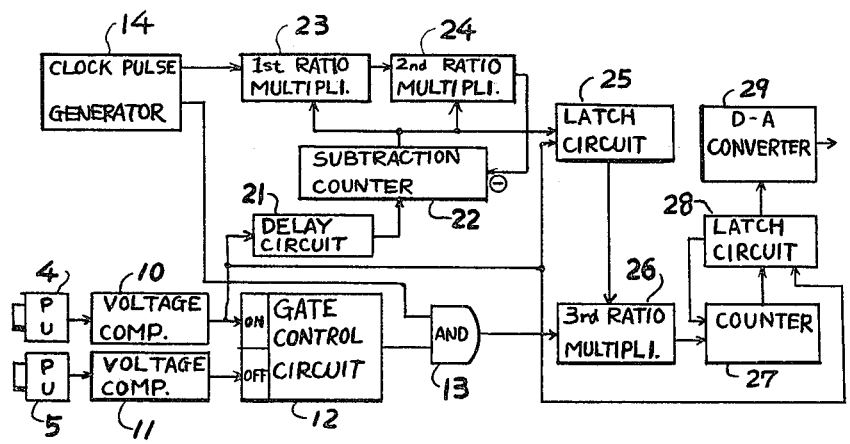
FIG. 4 is a block diagram showing an embodiment of the invention.
Figure 5:
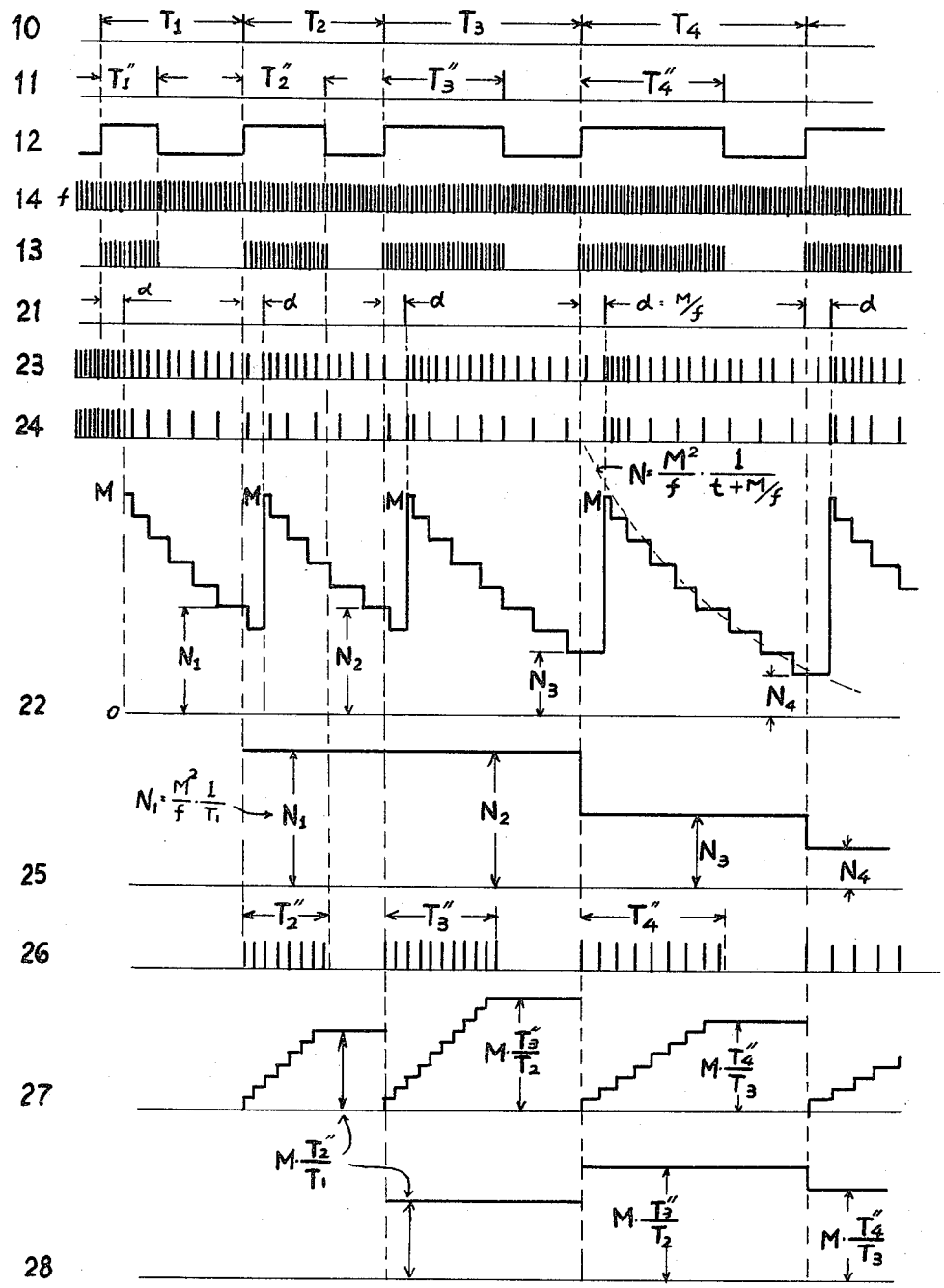
FIG. 5 is a waveform chart showing the outputs of various parts of the circuit of FIG. 4 to aid the illustration of the operation according to the invention.

Reference numerals provided on the left hand side in FIG. 5 designate respective output waveform generated in the circuit designated by like reference numerals in FIG. 4.

Figure 1:
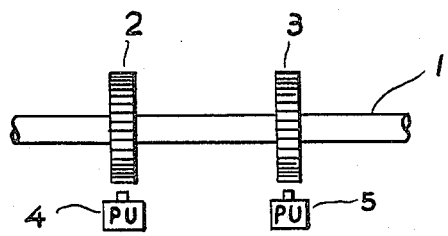
FIG. 1 is a schematic view of a conventional torque detector mounted on a rotatable shaft.

In the first circuit (i) a pair of AC voltage signals produced from the usual torque detector as shown in FIG. 1 are transmitted to respective voltage comparators 10 and 11 to produce a pulse series signal for each period of each AC voltage signal as shown in FIG. 5. The pair of AC voltage signals from the torque detector periodically change every time a tooth of each of the gears 2 and 3 passes by each of the electromagnetic pick-ups 4 and 5 as shown in FIG. 1. In other words, the output pulse series signals from the voltage comparators 10 and 11 each consists of a series of pulses each produced for every period $T$ ($T_1$, $T_2$,—) required for rotation of the shaft 1 for one pitch of the teeth of the gears 2 and 3. Also, since the waveform of the AC voltage signals corresponds to the tooth form of the gears 2 and 3, with twisting of the shaft 1 caused by application of torque to the shaft deviation from the waveforms is caused due to displacement of the gears 2 and 3 in the circumferential direction. As a result, there is produced time difference $T''$ ($T''_1$, $T''_2$,—) between the timing of generation between the output pulse series signals of the voltage comparators 10 and 11.

The inverse value $1/T$ to the period $T$ of the pulse series signals is proportional to the rotating speed of the shaft 1 during the period of the rotation of the shaft for one pitch of the teeth of the gears 2 and 3, and the ratio $T''/T$ of the time difference $T''$ to the period $T$ is proportional to the phase difference between the pair pulse series signals, that is, proportional to torque applied while the shaft 1 rotates for one pitch of the teeth of the gears 2 and 3.

The output pulse signals from the voltage comparators 10 and 11 are transmitted to a gate control circuit 12 to produce a gate signal of time width $T''$ ($T''_1$, $T''_2$,—), assuming the "on" state upon reception of the pulse series signal from the voltage comparator 10 and the "off" state upon reception of the pulse series signal from the voltage comparator 11, as shown at 12 in FIG. 5.

The gate signal thus produced on-off controls the AND circuit 13, that is, it serves as a control signal to let the AND circuit pass the clock pulses of the clock pulse generator 14 only for the time width $T''$, thus producing a pulse group signal, in which clock pulses are present only for the time width $T''$ as shown at 13 in FIG. 5.

Thus, denoting the clock pulse frequency by $f$ the number of clock pulses in each pulse group during each period $T$ ($T_1$, $T_2$,—) of the pulse series signals is $f \cdot T''$, which is proportional to the time width $T''$.

In the second circuit (ii) the clock pulses transmitted from the clock pulse generator 14 are multiplied by the first and second ratio multipliers 23 and 24 connected in series, the resultant output pulses are transmitted as a subtraction pulse to a counter 22. The subtraction counter 22 is reset to the initial value M every time an external subtraction start command is transmitted to it, and subsequently transmitted subtraction pulses are progressively subtracted from the initial value M so that the subtraction count N is progressively reduced to M-1, M-2, ...

The subtraction count N which is decreasing in this way is transmitted as ratio value presetting signal to the first and second ratio multipliers 23 and 24, and the ratio value is given as N/M where M is the ratio value presetting quantity.

As a result, the subtraction count N decreases with the lapse of time. Consequently, the ratio value N/M decreases, and the frequency of the output pulses of the first and second ratio multipliers 23 and 24 decreases as shown at 23 and 24 FIG. 5. In this way, the extent of decrease of the subtraction count N of the subtraction counter 22 for each constant short period of time, and it changes in inverse proportion to the lapse of time as shown in FIG. 5.

The above operation can be more clearly understood from equations to be discussed below.

Denoting the frequency of clock pulses of the clock pulse generator 14 by $f$, the initial value of the subtraction counter 22 by M, the subtraction count of the subtraction counter 22 by N, the period of the output pulse series of the voltage comparator 10 by T, the difference of the timing of generation of the output pulse series signals of the voltage comparators 10 and 11, that is, the time width, by $T''$ and the ratio value preset in the first and second ratio multipliers 23 and 24 by N/M, the frequency of the output pulses of the first ratio multiplier 23 is given as $(N/M) \cdot f$, and the frequency of the output pulses of the second ratio multiplier 24 is given as $(N/M)^2 \cdot f$.

Thus, denoting the subtraction count after the lapse of time t from the instant of impression of the subtraction start command to the subtraction counter 22 by N, the change ΔN of the subtraction count N that takes place during a very short time interval Δt elapsed from the instant is $$\Delta N = -\left(\frac{N}{M}\right)^2 \cdot f \cdot \Delta t \qquad (1)$$

Since Δt is very short, substituting dt for Δt and dN for ΔN and rearranging we have $$-\frac{1}{N^2} dN = \frac{f}{M^2} dN \qquad (2)$$

By solving the equation (2) and substituting the initial value M at t=0 it is seen that the subtraction count N after the lapse of the period t is $$N = \frac{M^2}{f} \cdot \frac{1}{(t + M/f)} \qquad (3)$$

Thus, the subtraction count of the subtraction counter 22 in this loop circuit is M at t=0, that is, at the time of impression of the subtraction start command and subsequently changes in inverse proportion to the sum of the time t elapsed and a constant value M/f.

The third circuit (iii) has the role of controlling the operation period t of the loop circuit.

The pulse series signal of the voltage comparator 10 is transmitted to the delay circuit 21, in which the delay period α is set to a constant value M/f, to produce delayed pulses each delayed by M/f as shown at 21 in FIG. 5, and each of the delayed pulses is transmitted as a subtraction start command to the subtraction counter 22. Thus, the subtraction counter 22 is set to the initial value M a constant period M/f after the appearance of the pulse series signal, and then it starts the subtracting operation. In the first latch circuit 25 the output pulse series signal from the voltage comparator is transmitted as latch signal, the subtraction count N transmitted there is latched every time the output pulse series signal is transmitted.

Thus, the time interval t from the impression of the subtraction start command till the impression of the latch command is $$t = T - f/M \qquad (4)$$

Consequently, by substituting the operation period represented by equation (4) into equation (3) the subtraction count N latched by the first latch circuit 25 is given as $$N = \frac{M^2}{f} \cdot \frac{1}{T} \qquad (5)$$

This means that the value latched by the first latch circuit 25 for each period T of the pulse series signal is proportional to the inverse value of the period T.

Thus, by successively taking out the values latched in the latch circuit 25 the inverse value of the period, i.e., the instantaneous rotating speed, can be obtained for each period as shown at 25 in FIG. 5. This inverse value corresponds to the frequency F (F=1/T) for the period of the pulse series signal, and by connecting a digital-to-analog converter to the first latch circuit 25 for conversion into a voltage signal it is possible to obtain a generally termed frequency-to-voltage converter of high response speed characteristic.

It will be understood that by adding a digital-to-analog converter to a construction comprising voltage comparator 10, clock pulse generator 14, delay circuit 21, subtraction counter 22, first and second ratio multipliers 23 and 24 and first latch circuit 25 a high response speed F-V converter can be obtained.

The fourth circuit (iv) is provided for taking out an output proportional to the ratio T''/T of the time width T'' between the pair of pulse series signals and period T, proportional to instantaneous torque, for each period T. A pulse group signal is transmitted from the AND circuit 13 in the first circuit (i) to the third ratio multiplier 26 and multiplied there by the preset ratio value. The preset ratio value of the third ratio multiplier 26 is transmitted from the first latch circuit 25, so that the ratio value becomes N/M (M: ratio value setting quantity of the third ratio multiplier 26, N: value latched in the first latch circuit 25, shown by equation (5)).

As a result, the pulse group signal is multiplied by N/M as shown at 26 in FIG. 5 and then transmitted to the counter 27 for counting.

The count of the counter 27 is latched by the second latch circuit 28 every time the pulse series signal of the voltage comparator 10 is transmitted to the latch circuit, and the counter 27 is reset immediately after latching. Thus, the value latched by the second latch circuit 28 is N/M times the number of pulses contained in each pulse group in the pulse group signal.

The pulse number in each pulse group in the pulse group signal is f·T'' as explained in connection with the circuit (i), and N/M times the pulse number is $$T'' \cdot f \cdot N/M = T'' \cdot f \cdot \frac{1}{M} \cdot \frac{M^2}{f} \cdot \frac{1}{T} = M \cdot \frac{T''}{T} \qquad (6)$$

This means that value latched in the second latch circuit 28 for each period T of the pulse series signal is proportional to the ratio of the difference T'' of the timing of generation between the pair of AC voltage signals and the period T thereof. Thus, by taking out the value latched in the second latch, circuit 28 either directly or after converting it into a corresponding analog through the digital-to-analog converter 29 it is possible to measure the phase difference between the pair of AC voltage signals from the torque detector, proportional to T''/T, that is, the instantaneous value of torque.

As has been shown, with the pair of AC voltage signals produced from the torque detector shown in FIG. 1 the instantaneous rotating speed of the rotation of the shaft 1 for one pitch of the gears 2 and 3 is proportional the inverse value of the period T, and the instantaneous value of torque while the shaft 1 is rotating for one pitch of the gears 2 and 3 is proportional to the ratio of the time width T'' between the pair of AC signals to the period T thereof. According to the invention this instantaneous torque value is taken out by calculating it for each period T, so that the instantaneous values of rotating speed and torque can be obtained on the real time basis and continuously.

Also, since according to the invention the measurement and calculation are carried out by a digital method making use of clock pulses, it is possible to obtain the results of measurement with high precision.

Thus, the analysis of variations of torque and rotating speed can be made simultaneously during the measurement operation, and also the measurement value which is obtained on the real time basis can be utilized as feedback signal for high speed and high precision control.

What is claimed is:

1. An instantaneous torque determining apparatus comprising:
   a first and a second voltage comparator electrically connected to a torque detector and converting two AC voltage signals transmitted from said torque detector into corresponding pulse signals for every cycle of said AC voltage signals;
   a gate control circuit electrically connected to said first and second voltage comparators and producing a gate signal by being rendered "on" with an output pulse of said first voltage comparator and "off" with an output pulse of said second voltage comparator;
   a clock pulse generator producing a clock pulse signal at a constant frequency;
   an AND circuit electrically connected to said gate control circuit and said clock pulse generator and passing clock pulses during the "on" state of said gate signal;
   a first ratio multiplier electrically connected to said clock pulse generator and multiplying the clock pulse output by a ratio value preset at a ratio value setting terminal;
   a second ratio multiplier electrically connected to said first ratio multiplier and multiplying the pulse output of said first ratio multiplier by a ratio value preset at a ratio value setting terminal;
   a delay circuit electrically connected to said first voltage comparator and delaying the pulse output thereof for a constant period of time;
   a subtraction counter electrically connected to output terminals of said second ratio multiplier and said delay circuit and also electrically connected to the ratio value setting terminals of said first and second ratio multipliers, said subtraction counter being reset by an output pulse of said delay circuit to start subtractive counting of the output pulses of said second ratio multiplier and providing the count during the subtractive counting to the ratio value setting terminals of said first and second ratio multipliers;
   a first latch circuit electrically connected to said first voltage comparator and to said subtraction counter and latching the count of said subtraction counter with an output pulse of said first voltage comparator;
   a third ratio multiplier electrically connected to said first latch circuit and to said AND circuit and multiplying the pulse output of said AND circuit by a ratio value proportional to the latched value of said first latch circuit coupled to the ratio value setting terminal;
   a counter electrically connected to said third ratio multiplier and counting output pulses thereof;
   a second latch circuit electrically connected to said counter and to said first voltage comparator, said second latch circuit serving to latch the count of said counter with an output pulse of said first voltage comparator and zero resetting said counter after the latching; and
   a D-A converter electrically connected to said second latch circuit and converting the value latched thereby into a corresponding analog signal.

2. In an instantaneous torque determining apparatus having a first and a second voltage comparator electrically connected with a torque detector for converting AC voltage signals transmitted from said torque detector into corresponding pulse signals for every cycle of said AC voltage signals, and
   a delay circuit receiving said pulse signal from said first voltage comparator and delaying said pulse signal for a constant period of time;
   a clock pulse generator producing a clock pulse signal at a constant frequency;
   a first ratio multiplier electrically connected to said clock pulse generator and multiplying the clock pulse output by a ratio value preset at a ratio value setting terminal;
   a second ratio multiplier electrically connected to said first ratio multiplier and multiplying the pulse output of said first ratio multiplier by a ratio value preset at a ratio value setting terminal;
   a subtraction counter electrically connected to output terminals of said second ratio multiplier and said delay circuit and also electrically connected to the ratio value setting terminals of said first and second ratio multipliers, said subtraction counter being reset by an output pulse of said delay circuit to start subtractive counting of the output pulses of said second ratio multiplier and providing the output during the subtractive counting to the ratio value setting terminals of said first and second ratio multipliers;
   a latch circuit arrangement electrically connected to said first voltage comparator and said subtraction counter for receiving said pulse signal and latching the count of said subtraction counter by said pulse signal; and
   a D-A converter electrically connected to said latch circuit arrangement and converting the value latched thereby into a corresponding analog signal.

3. The torque determining apparatus according to claim 2, wherein said latch circuit arrangement includes:
   a first latch circuit and a second latch circuit, a third ratio multiplier, and a counter;
   said first latch circuit being operatively connected with said subtraction counter and said first voltage comparator, said first latch circuit receiving the pulse output from said first voltage comparator as a latching instruction to latch the output of said subtraction counter applied to said first latch circuit every time said latching instruction is applied;
   said third ratio multiplier being operatively connected with said first latch circuit and an AND circuit for receiving and storing the latched value from said first latch circuit as a ratio set value and multiplying gated clock pulses received from said and circuit by said ratio set value;
   said counter being operatively connected to receive and count output pulses from said third ratio multiplier;
   said second latch circuit being operatively connected to said counter and to said first voltage comparator to latch the count of said counter every time a pulse is received from said first voltage comparator and then to zero-return said counter; and, said D-A converter being operatively connected to said second latch circuit to generate an output of an analog voltage corresponding to the latched value of said second latch circuit.

4. The torque determining apparatus according to claim 3, wherein: said subtraction counter and said first and said second ratio multipliers comprise a loop circuit.

5. The torque determining apparatus according to claim 2, wherein said subtraction counter and said first and said second ratio multipliers comprise a loop circuit that provides an output of subtracted value from said subtraction counter.

* * * * *